(12) United States Patent
Boriack et al.

(10) Patent No.: US 11,441,666 B2
(45) Date of Patent: Sep. 13, 2022

(54) SPROCKET FOR AGRICULTURAL VEHICLE

(71) Applicant: CNH Industrial America LLC, New Holland, PA (US)

(72) Inventors: Cale N. Boriack, Lititz, PA (US); Michael Minnich, Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 414 days.

(21) Appl. No.: 16/750,480

(22) Filed: Jan. 23, 2020

(65) Prior Publication Data
US 2021/0231208 A1    Jul. 29, 2021

(51) Int. Cl.
| | |
|---|---|
| *F16H 55/30* | (2006.01) |
| *A01D 61/00* | (2006.01) |
| *F16H 55/08* | (2006.01) |
| *B65G 23/06* | (2006.01) |
| *A01D 61/04* | (2006.01) |
| *B65G 17/06* | (2006.01) |

(52) U.S. Cl.
CPC ........... *F16H 55/30* (2013.01); *A01D 61/008* (2013.01); *A01D 61/04* (2013.01); *B65G 23/06* (2013.01); *F16H 55/0806* (2013.01); *B65G 17/063* (2013.01); *B65G 2201/0202* (2013.01)

(58) Field of Classification Search
CPC ... F16H 55/30; F16H 55/0806; A01D 61/008; A01D 61/04; B65G 23/06; B65G 2201/0202; B65G 17/063; A01F 12/18
See application file for complete search history.

(56) References Cited

U.S. PATENT DOCUMENTS

| | | | | |
|---|---|---|---|---|
| 4,530,679 A | * | 7/1985 | Reynolds | B27B 17/08 |
| | | | | 30/381 |
| 5,478,277 A | | 12/1995 | Kloefkorn | |
| 6,142,900 A | * | 11/2000 | Takamori | F16H 55/30 |
| | | | | 474/152 |

(Continued)

FOREIGN PATENT DOCUMENTS

| | | | | |
|---|---|---|---|---|
| CN | 103486224 A | * | 1/2014 | ............. F16H 55/30 |
| EP | 934871 A2 | * | 8/1999 | ............. B62M 9/10 |

(Continued)

*Primary Examiner* — Mark A Deuble
(74) *Attorney, Agent, or Firm* — Peter Zacharias; Patrick Sheldrake

(57) ABSTRACT

A conveyor for a combine harvester includes a chain and a sprocket. The sprocket includes an annular body defining an axis of rotation, two opposing sides, an outer perimeter extending between the two opposing sides, and gear teeth disposed on the outer perimeter. A bottom land extends between valleys of adjacent gear teeth. A single continuous edge is defined between two gear teeth at one of the adjacent sides. The bottom land includes (i) a central plateau portion, (ii) a first sloping surface extending from one edge of the central plateau portion to the single continuous edge at one of the two opposing sides, and (iii) a second sloping surface extending from the opposite edge of the central plateau portion to the single continuous edge at the other of the two opposing sides. The sloping surfaces either limit or prevent the accumulation of material thereon.

21 Claims, 5 Drawing Sheets

(56) References Cited

U.S. PATENT DOCUMENTS

| | | |
|---|---|---|
| 6,945,023 B2 | 9/2005 | Vandewalle et al. |
| 9,550,243 B2 | 1/2017 | Ohmi |
| 9,719,590 B2 * | 8/2017 | Reiter .................. B62M 9/10 |
| 10,390,485 B2 * | 8/2019 | Heyns .................. A01F 12/10 |
| 2011/0094856 A1 * | 4/2011 | Guldenfels ............ F16H 55/30 |
| | | 198/834 |
| 2015/0285363 A1 * | 10/2015 | Pfeiffer ................ B62M 9/10 |
| | | 474/152 |
| 2016/0238122 A1 * | 8/2016 | Medaglia ............... F16H 55/12 |
| 2017/0258009 A1 | 9/2017 | Heyns et al. |
| 2017/0283005 A1 * | 10/2017 | Inoue ................... F16H 55/30 |
| 2018/0363752 A1 | 12/2018 | Chin |
| 2021/0237978 A1 * | 8/2021 | Isaac .................. A01D 61/008 |

FOREIGN PATENT DOCUMENTS

| | | | |
|---|---|---|---|
| FR | 2343175 A1 | 9/1977 | |
| WO | WO-2013126307 A1 * | 8/2013 | ............ B65G 23/06 |

* cited by examiner

SPROCKET FOR AGRICULTURAL VEHICLE

FIELD OF THE INVENTION

The present invention relates to chain rotating assemblies, and, more specifically to chain rotating assemblies for conveyors. The conveyors may be used in agricultural vehicles such as combine harvesters. The chain rotating assemblies may be configured for use with feeders or elevators of the combine harvester.

BACKGROUND OF THE INVENTION

As is described in U.S. Pat. No. 10,390,485, which is incorporated by reference herein in its entirety and for all purposes, an agricultural harvester known as a "combine" is historically termed such because it combines multiple harvesting functions with a single harvesting unit, such as picking, threshing, separating and cleaning. A combine includes a header which removes the crop from a field, and a feeder which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

An agricultural feeder of a combine can include a chain engaged with teeth of a sprocket mounted on a rotating shaft. As the shaft rotates, the sprocket also rotates and the teeth of the sprocket engaged with the chain cause rotation of the chain. The chain can engage the teeth of two sprockets to form an endless chain between the two sprockets, with the portion of the chain between the two sprockets moving in a linear, rather than rotational, direction. Paddles or other types of conveying elements can be driven by the chain and contact crop material to convey the crop material in the linear direction before rotating about the sprockets at each end of the endless chain to switch linear direction movement. This allows rotational movement of the shaft to continuously drive the chain and connected conveying elements to linearly move crop material across the feeder.

One particular problem with current constructions is that fed material or debris can become wrapped, impacted or accumulated on the sprockets or shaft rotating the sprockets, as well as under the chain. Material that accumulates on the shaft and/or sprocket can cause friction, requiring more power to rotate the shaft. Further, when material accumulates under the chain during rotation, the effective diameter of the chain can be increased such that the teeth of the sprockets do not engage every link in the chain as the chain is driven by the sprockets. Such an occurrence of the chain skipping one or more teeth of the sprockets is referred to as "chain jumping," and has been found to significantly reduce the durability of the chain.

What is needed in the art is a feeder or other chain rotating assembly that is less prone to adverse effects caused by material and debris wrapping, impacting, and/or accumulating on the sprockets, the shaft rotating the sprockets, and/or the chain being rotated by the sprockets.

SUMMARY OF THE INVENTION

In one exemplary aspect, there is provided a conveyor for a combine harvester includes a chain and a sprocket that is configured to drive the chain. The sprocket includes an annular body defining an axis of rotation, two opposing sides, an outer perimeter extending between the two opposing sides, and gear teeth disposed on the outer perimeter. A bottom land extends between valleys of adjacent gear teeth. A single continuous edge is defined between two gear teeth at one of the adjacent sides. The bottom land includes (i) a central plateau portion, (ii) a first sloping surface extending from one edge of the central plateau portion to the single continuous edge at one of the two opposing sides, and (iii) a second sloping surface extending from the opposite edge of the central plateau portion to the single continuous edge at the other of the two opposing sides. An acute angle is defined between transition surfaces of adjacent gear teeth that face one another, and one of the sloping surfaces interconnects the transition surfaces of the adjacent gear teeth. The sloping surfaces either limit or prevent the accumulation of material thereon.

In another exemplary aspect, there is provided a sprocket for a conveyor of a combine harvester. The sprocket includes an annular body defining an axis of rotation, two opposing sides, an outer perimeter extending between the two opposing sides, and gear teeth disposed on the outer perimeter. A bottom land extends between valleys of adjacent gear teeth. A single continuous edge is defined between two gear teeth at one of the adjacent sides. The bottom land includes (i) a central plateau portion, (ii) a first sloping surface extending from one edge of the central plateau portion to the single continuous edge at one of the two opposing sides, and (iii) a second sloping surface extending from the opposite edge of the central plateau portion to the single continuous edge at the other of the two opposing sides. An acute angle is defined between transition surfaces of adjacent gear teeth that face one another, and one of the sloping surfaces interconnects the transition surfaces of the adjacent gear teeth. The sloping surfaces either limit or prevent the accumulation of material thereon.

BRIEF DESCRIPTION OF THE DRAWINGS

Embodiments of inventions will now be described, strictly by way of example, with reference to the accompanying drawings, in which.

DETAILED DESCRIPTION OF THE DRAWINGS

Exemplary embodiments of the present invention provide a sprocket for an agricultural vehicle. It will be appreciated that other embodiments may be used in other types of machines having a similar arrangement of parts, upon incorporation of the appropriate features of the inventions herein.

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
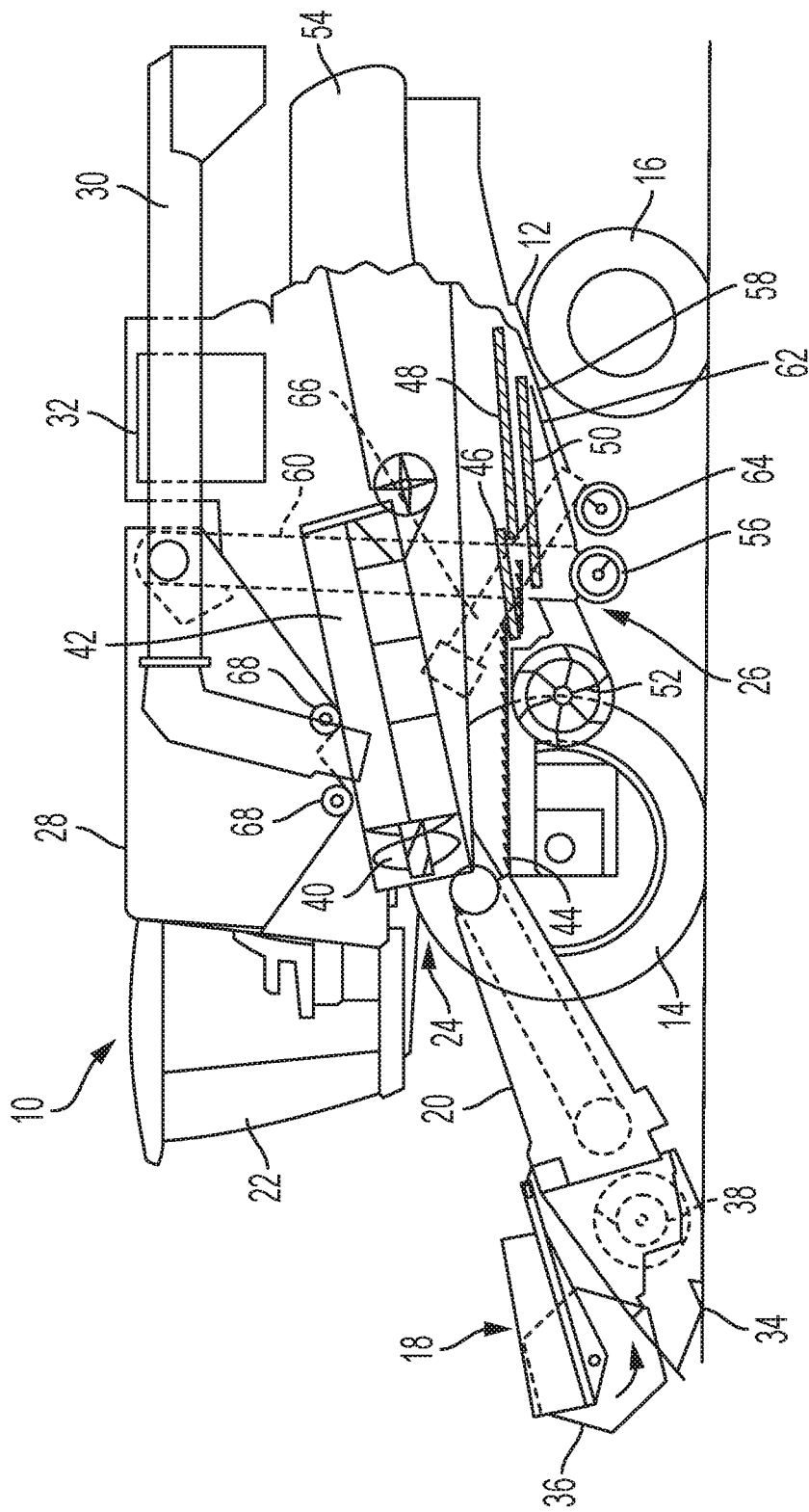
FIG. 1 is a side view of an embodiment of an agricultural harvester in the form of a combine.

Referring now to the drawings, and more particularly to FIG. 1, there is shown an agricultural harvester in the form of a combine 10, which generally includes a chassis 12, ground engaging wheels 14 and 16, a header 18, a feeder 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc. It should be understood at the outset that the details of the combine 10 may vary and the sprocket described herein is not limited for use with the combine 10.

Front wheels 14 are larger flotation type wheels, and rear wheels 16 are smaller steerable wheels. Motive force is selectively applied to front wheels 14 through a power plant in the form of a diesel engine 32 and a transmission (not shown).

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder 20. Feeder 20 (also referred to herein as a conveyor) conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. Cross augers 68 at the bottom of grain tank 28 convey the clean grain within grain tank 28 to unloading auger 30 for discharge from combine 10.

Figure 2:
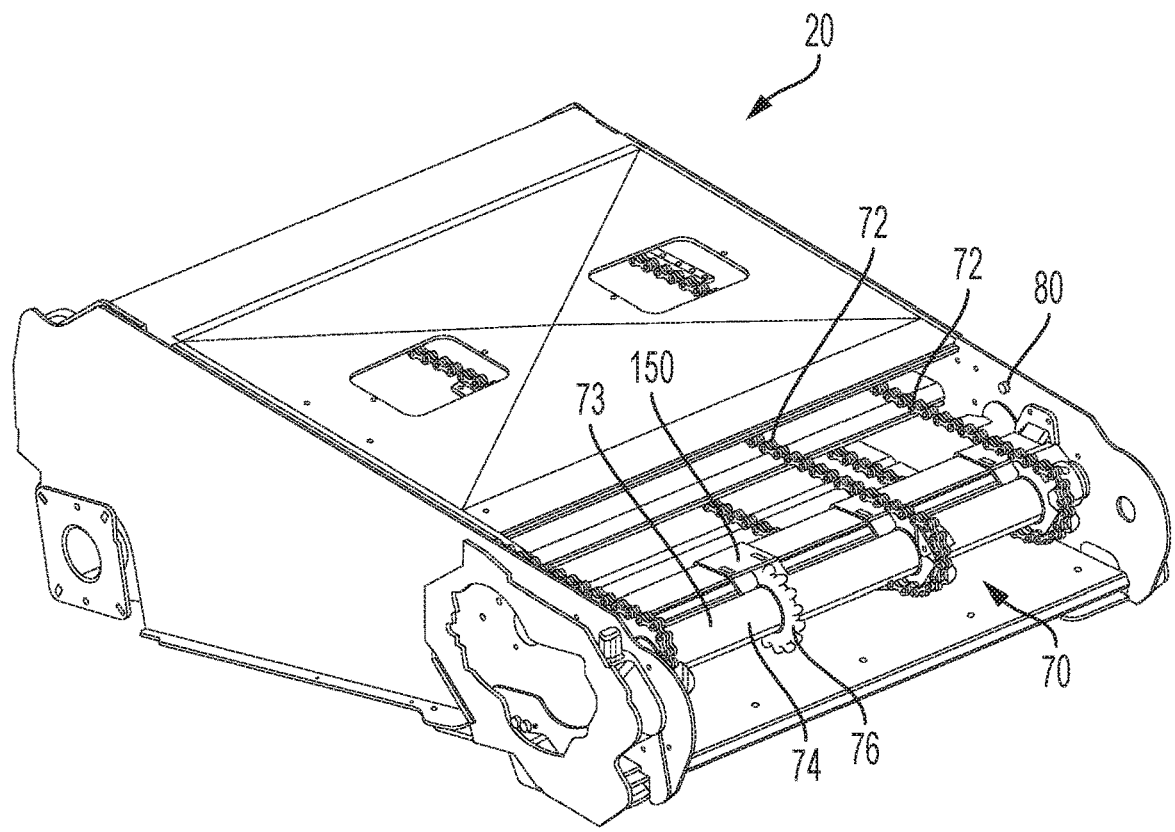
FIG. 2 is a perspective view of an embodiment of a feeder according to the present invention.

Referring now to FIG. 2, the feeder 20 includes an assembly 70 for rotating a chain 72, which includes a shaft 74, and a series of sprockets 76 mounted on the shaft 74. The assembly 70 and chain 72 can together be referred to as a conveyor 73. It should be appreciated that FIG. 2 illustrates a single shaft 74 driving multiple sprockets 76 and engaging chains 72, with such a system defining multiple assemblies 70 for rotating chains 72. For ease of description, only one such assembly 70 is described herein unless otherwise stated, but all of the assemblies 70 can be configured similarly or identically. As can be seen, the shaft 74 is rotatably mounted to a frame 80 of the feeder 20 and can be rotated by connection to a driven gear (not shown). The shaft 74 can also be rotated by the chain 72 engaging the sprocket 76, with the chain 72 being rotated by a different sprocket or other element.

Figure 3:
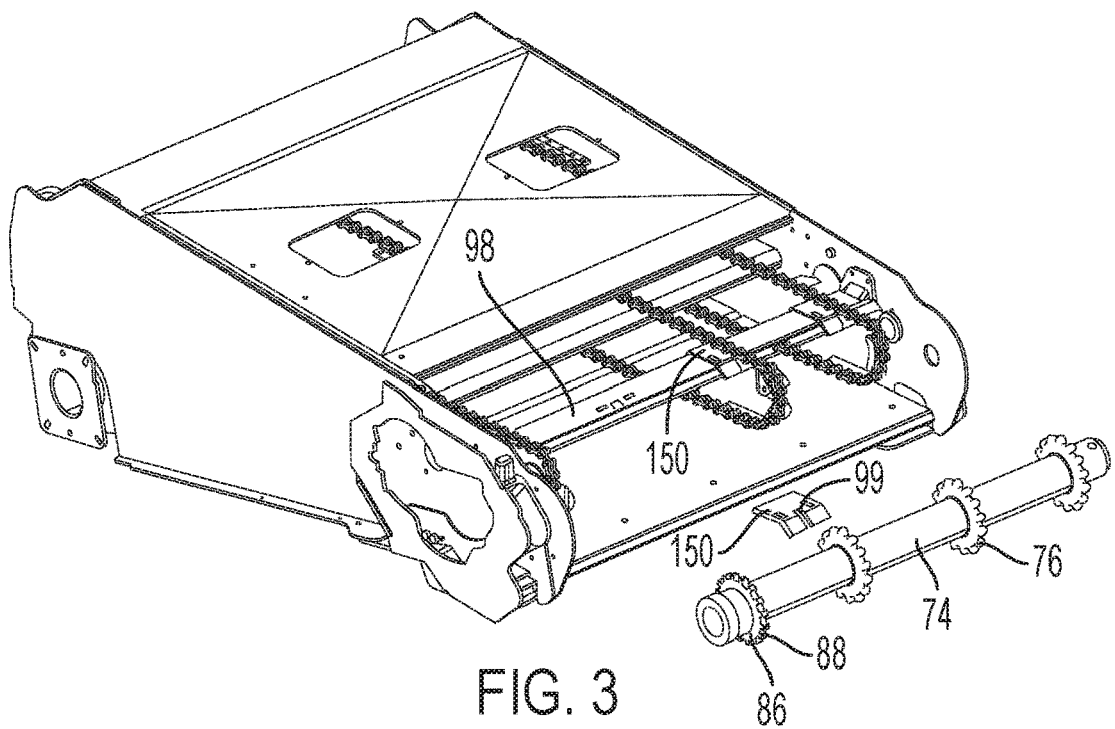
FIG. 3 is a partially exploded view of the feeder shown in FIG. 2.

Referring now to FIGS. 2 and 3, the sprocket 76 can include an annular main sprocket body 86 with multiple radially extending teeth 88 connected to the circumference of the sprocket body 86. The sprocket body 86 has a bore formed therethrough that passes over the shaft 74. The bore is shaped to engage the shaft 74 so rotation of the shaft 74 also causes rotation of the sprocket 76, or vice versa, such that the shaft 74 defines an axis of rotation of the sprocket 76. As shown, the teeth 88 of the sprocket 76 are spaced about the circumference of the sprocket body 86 so each tooth 88 engages one link 92 of the chain 72 during rotation of the sprocket 76, with the number and placement of teeth 88 on the sprocket 76 being chosen to engage each link 92 of the chain 72 as the sprocket 76 rotates and the links 92 rotate about the sprocket 76. Engaging each link 92 of the chain 72 with a tooth 88 of the sprocket 76 as the sprocket 76 and chain 72 rotate allows for smooth operation of the chain 72 and any conveying elements that might be connected to the chain 72, such as slats or paddles. It should be appreciated, however, that each tooth 88 does not need to engage a link 92 of the chain 72 during rotation, such as in the case of a double pitch conveyor chain where only one out of two teeth engage a chain. Further, the shape and layout of the teeth 88 of the sprocket 76 can be adjusted to engage elements other than links 92 of a chain 72, such as the teeth of a toothed belt.

To increase the effective life of the chain 72, a sprocket stripper 150 is attached to a bracket 98 extending across the frame 80. The sprocket stripper 150 may also be referred to herein as a material removal device. The sprocket stripper 150, which is shown schematically, is a wear resistant plate, which may not be flexible. One end of each sprocket stripper 150 is fixedly attached to the bracket 98, whereas the other end of the sprocket stripper 150 is free and unconstrained. A recess 99 is formed on the free end of each sprocket stripper 150. The toothed surface of a sprocket 76 is positioned within the recess 99, such that the sides of the recess 99 are positioned to remove accumulated crop material from the peripheral surface of the teeth 88 of the sprocket 76. Removing the accumulated crop material from the teeth of the sprocket 76 increases the effective life of the chain 72, for the reasons described in the background section.

It should be understood that the sprocket stripper 150 may vary from that which is shown and described. An alternative sprocket stripper is disclosed in U.S. Pat. No. 10,028,444, for example.

Figure 4:
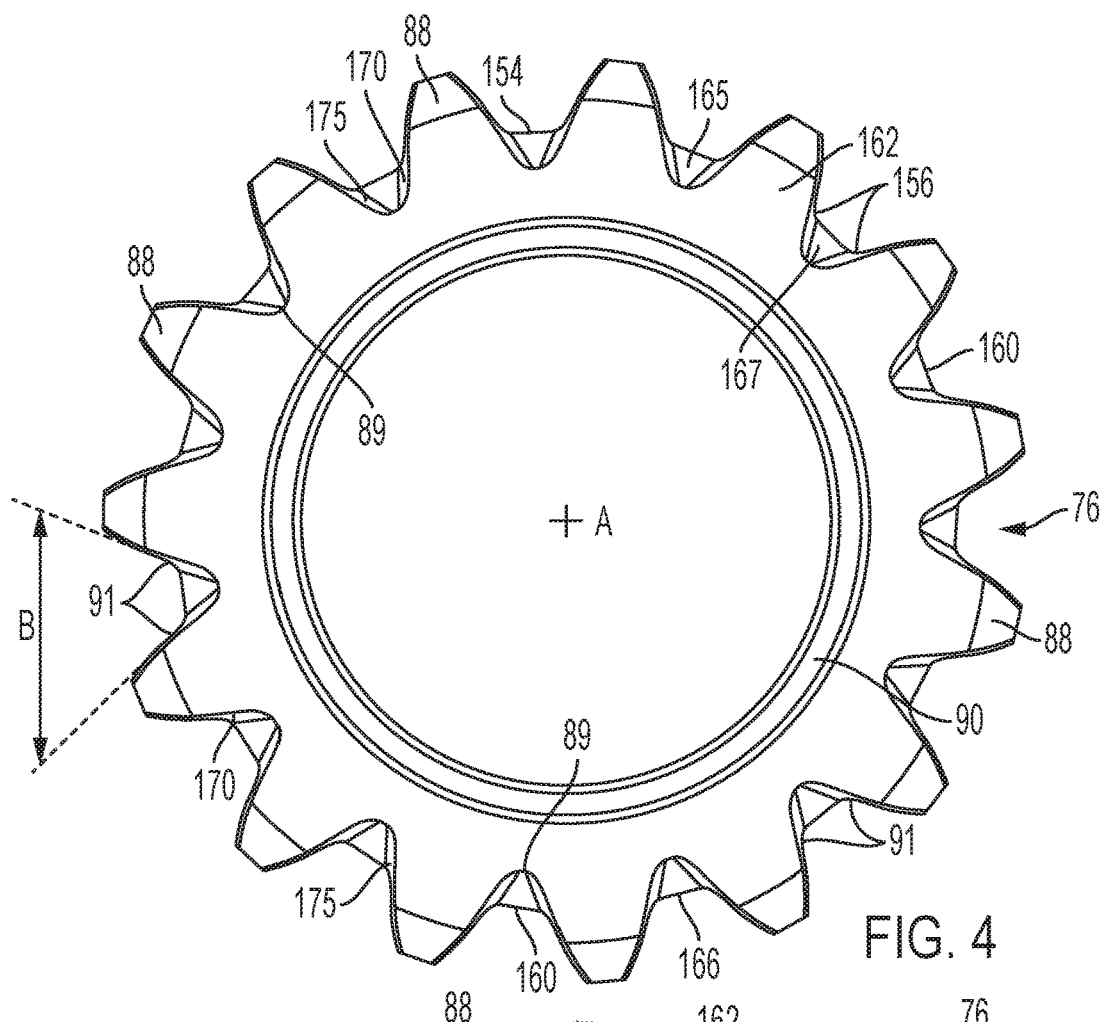
FIGS. 4 and 5 are side elevation and top plan views, respectively, of a sprocket according to the present invention. The opposite side elevation view of the sprocket is substantially identical to FIG. 4.
Figure 4A:
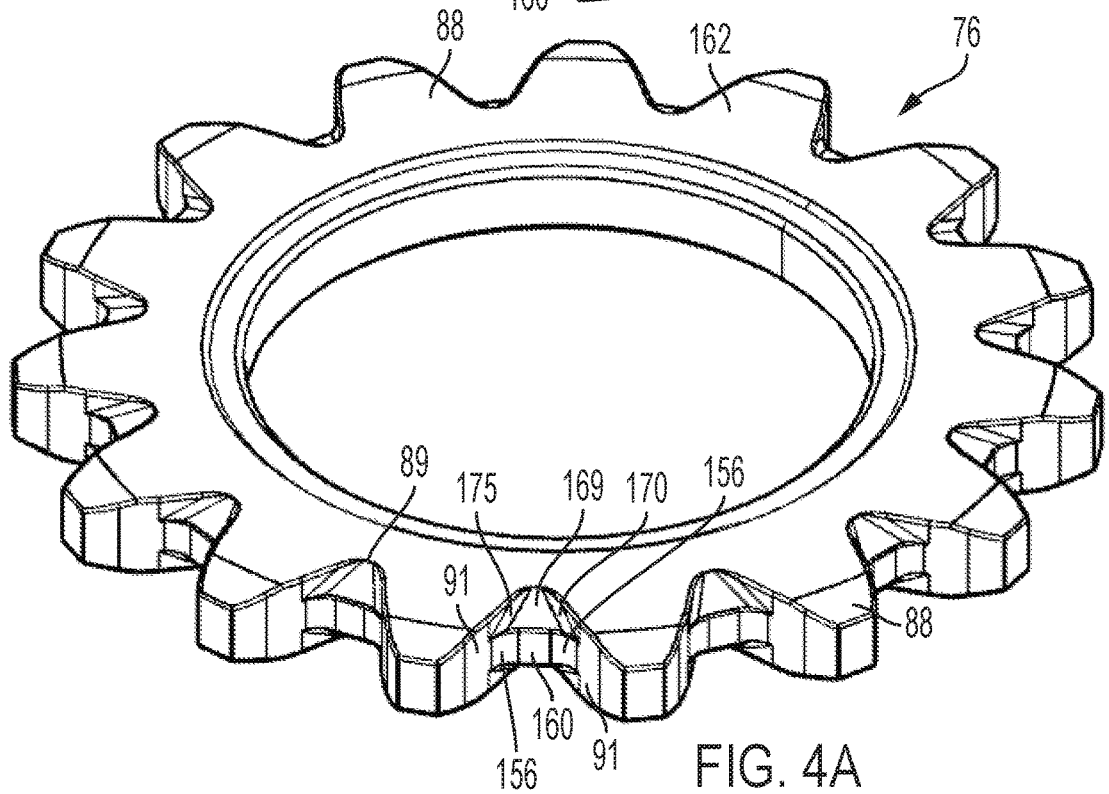
FIG. 4A depicts an isometric view of the sprocket.
Figure 5:
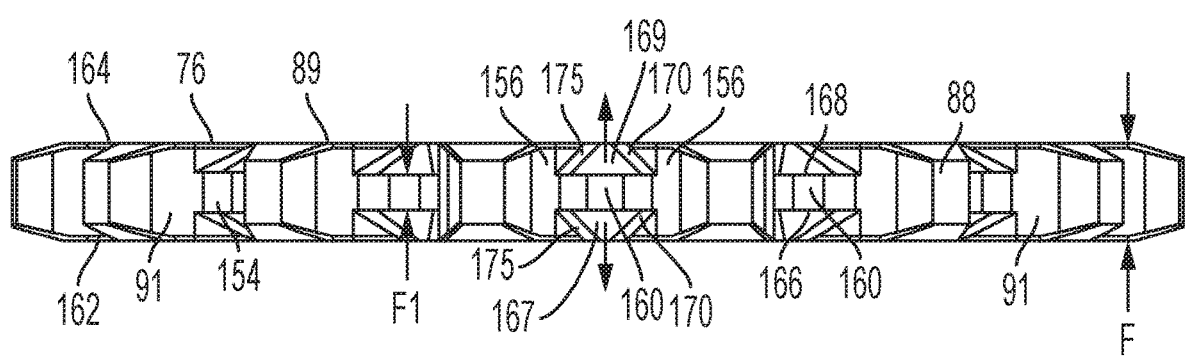

Referring now to FIGS. 4 and 5, those figures depict the sprocket 76. The sprocket 76 comprises an annular body 86 having an axis of rotation 'A' about its center and teeth 88 disposed on its outer circumference and regularly spaced apart about the outer circumference. The individual teeth 88 may have a V-shape (as shown), a C-shape or a U-shape, for example, as viewed from the side. The individual teeth 88 may have an involute tooth profile.

A bottom land 154 of the sprocket 76 extends circumferentially between the valleys of adjacent teeth 88. The bottom land 154 adjoins the fillet 156 of one tooth 88 with the fillet 156 of an adjacent tooth 88. Each bottom land 154 includes a central plateau portion 160. The central plateau portion 160 is a cylindrical surface that extends circumferentially about the axis A and has a width 'F1.' The width 'F1' of the central plateau portion 160 is less than the width 'F' of the sprocket 76, which extends between the sides 162 and 164. The width 'F1' of the central plateau portion 160 constitutes about one-third to one-half of the width 'F.' The central plateau portion 160 is centered along the width 'F' of the sprocket 76 as viewed in an axial direction along axis A. The central plateau portion 160 is curved in a circumferential direction about the axis A, however, the central plateau portion 160 does not curve in an axial direction along the axis A. In other words, a straight line parallel to axis A extending in an axial direction (i.e., along axis A) can be superimposed along the exterior surface of the portion 160.

The central plateau portion 160 could vary from that which is shown and described. For example, central plateau portion 160 could be a flat plane extending perpendicular to the radial direction (i.e., a straight line extending between the teeth 88 rather an arc extending circumferentially).

A series of reliefs 165 are each disposed between adjacent teeth 88. The reliefs 165 are disposed on the side 162 as well as the side 164. Each relief 165 is a depression, cutout or pocket that is formed in one of the two sides 162 and 164 of the sprocket 76. Geometrically, the reliefs 165 extend (i) axially from one of the sides 162/164 to the portion 160, (ii) circumferentially from one teeth 88 to an adjacent tooth 88, and (iii) radially from the portion 160 toward the axis A. The outermost edge 89 of the relief 165 that intersects one of the sides 162 or 164 follows the trajectory of the teeth 88. The outermost edge 89 is substantially U-shaped and concave. The U-shape could have a constant radius, for example. The edge 89 does not include any convex portions, which could trap crop material and cause the sprocket stripper 150 to undesirably move the crop material back toward the central plateau portion 160.

The edge 89 is not limited to having a U-shape, and could also be V-shaped (i.e., defined by two intersecting edge portions having an angle formed therebetween) if the radius at the intersection of the two intersecting edge portions was sufficiently small. The edge 89 could have a flat bottom (i.e., two straight or angled edge portions that are interconnected by a flat edge portion |_| or \_/ ). The edge 89 could be trapezoidal \_/, for example.

The reliefs 165 comprise a sloping surface 167 or 169 depending upon the side 162 or 164 (respectively) upon which the relief 165 is formed. More particularly, the sloping surface 167 extends between the left circumferentially extending edge 166 of the central plateau portion 160 and the side 162 of the sprocket 76. The sloping surface 167 leads toward the axis A, as viewed in a direction toward the side 162, and intersects the edge 89. A transition surface 170 extends between one side of sloping surface 167, a flank 91 and the edge 89. Another transition surface 175 extends between the opposing side of sloping surface 167, an adjacent flank 91 and the edge 89. An acute angle B is formed between the flanks 91 of the teeth. The acute angle B is also formed between the transition surfaces 170 and 175 of the adjacent gear teeth. It is further noted that adjacent transition surfaces 170 and 175 are non-parallel. The sloping surface 167 extends in a radial direction to the edge 89 and a position that is closer to the axis A than the central plateau portion 160. The sloping surface 167 may be beveled (as shown), planar, or slightly rounded.

Similarly, a sloping surface 169 extends between the right circumferentially extending edge 168 of the central plateau portion 160 and the side 164 of the sprocket 76. The geometry of the sloping surface 169 is either identical to or substantially identical to that of the sloping surface 167, thus, the sloping surface 169 will not be described in detail.

In use, interaction between the sprocket 76 and its chain 72 causes the crop material residing on the central plateau portion 160 to move in an outward direction. The crop material then travels down along the sloping surfaces 167 and 169 as a result of gravity and the geometry of those sloping surfaces Specifically, the sloping surfaces 167 and 169 each provides a passageway for the material to escape at a location beneath the chain 72. The stripper 150 then removes the crop material exiting from the sloping surfaces.

The sprocket 76 may be either machined or molded from either plastic or metal, for example.

Figure 6:
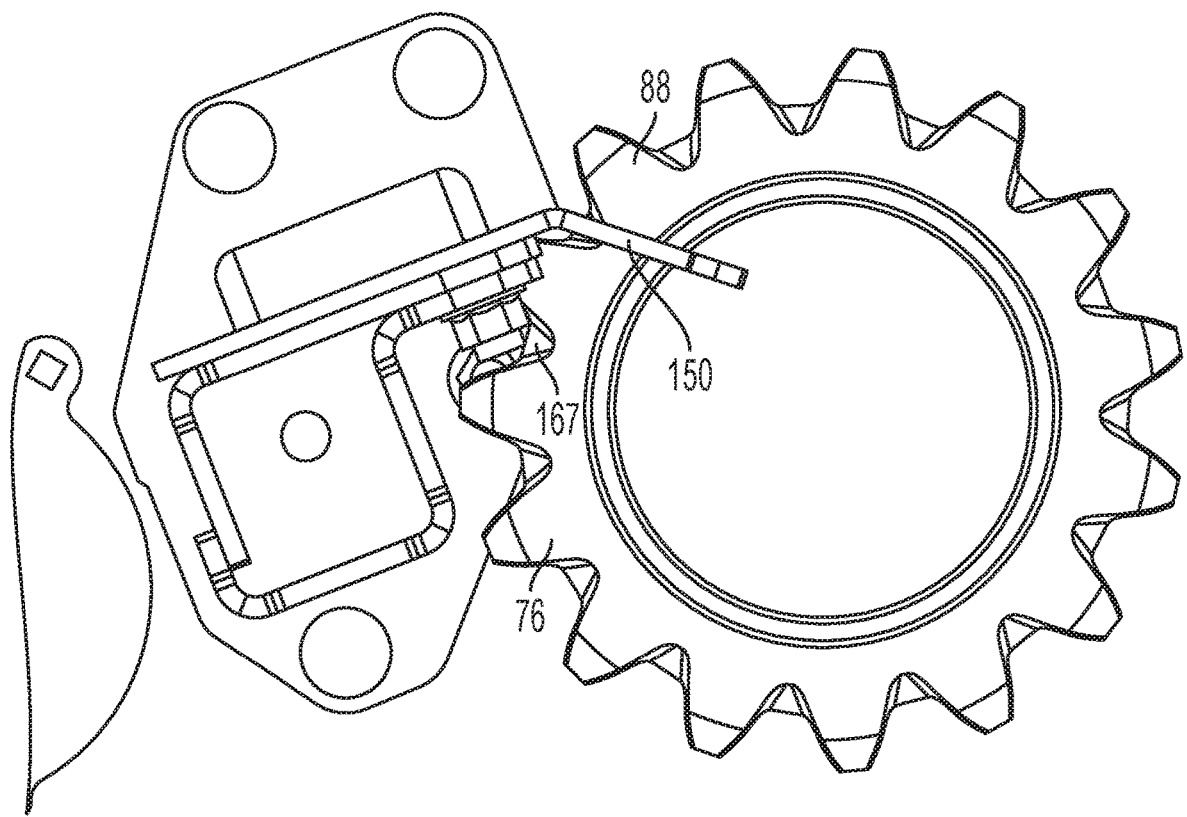
FIG. 6 is a side elevation view of the sprocket of FIGS. 4 and 5 interacting with a sprocket stripper.

FIG. 6 depicts a view of the sprocket stripper 150 interacting with the sprocket 76. The sprocket stripper 150 and the sprocket 76 may constitute a sprocket assembly.

It should be understood that the sprockets described herein are not limited for use with feeders for agricultural vehicles. The sprockets may be incorporated into any component or system of material conveyor. The sprockets may be incorporated into any component or system of the agricultural vehicle, such as an elevator of a combine harvester, as is described in U.S. Pat. No. 10,028,444, which is incorporated by reference in its entirety.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

What is claimed is:

1. A conveyor for a combine harvester comprising a chain and a sprocket that is configured to drive the chain, the sprocket including:
    an annular body defining an axis of rotation, two opposing sides, an outer perimeter extending between the two opposing sides, and a plurality of gear teeth disposed on the outer perimeter,
    wherein a bottom land extends between valleys of adjacent gear teeth,
    wherein a single continuous edge is defined between two gear teeth at one of the adjacent sides,
    wherein the bottom land includes (i) a central plateau portion, (ii) a first sloping surface extending from one edge of the central plateau portion to the single continuous edge at one of the two opposing sides, and (iii) a second sloping surface extending from the opposite edge of the central plateau portion to the single continuous edge at the other of the two opposing sides,
    wherein an acute angle is defined between transition surfaces of adjacent gear teeth that face one another, and one of the sloping surfaces interconnects the transition surfaces of the adjacent gear teeth,
    wherein the sloping surfaces are configured to either prevent or limit the accumulation of material thereon.

2. The conveyor of claim 1, wherein a width (F1) of the central plateau portion measured between the two opposing sides is less than a total width (F) of the sprocket measured between the two opposing sides.

3. The conveyor of claim 2, wherein the central plateau portion is centered along the width (F) of the sprocket in an axial direction.

4. The conveyor of claim 1, wherein the central plateau portion is curved in a circumferential direction about the axis of rotation, whereas the central plateau portion does not curve in an axial direction along the axis of rotation.

5. The conveyor of claim 1, wherein the central plateau portion is either a cylindrical surface or a flat surface.

6. The conveyor of claim 1, wherein each sloping surface is either beveled or rounded.

7. The conveyor of claim 1, wherein the single continuous edge is disposed closer to the axis of rotation than the bottom land.

8. The conveyor of claim 1, wherein said transition surfaces are non-parallel.

9. The conveyor of claim 1, wherein the single continuous edge is concave.

10. The conveyor of claim 1, wherein the single continuous edge is neither convex nor partially convex.

11. The conveyor of claim 1 further comprising a material removal device mounted adjacent to the sprocket for removing material accumulated on the sprocket.

12. A combine harvester comprising the conveyor of claim 1.

13. A sprocket for a conveyor, the sprocket comprising:
    an annular body defining an axis of rotation, two opposing sides, an outer perimeter extending between the two opposing sides, and a plurality of gear teeth disposed on the outer perimeter,
    wherein a bottom land extends between valleys of adjacent gear teeth,
    wherein a single continuous edge is defined between two gear teeth at one of the adjacent sides,
    wherein the bottom land includes (i) a central plateau portion, (ii) a first sloping surface extending from one edge of the central plateau portion to the single continuous edge at one of the two opposing sides, and (iii) a second sloping surface extending from the opposite edge of the central plateau portion to the single continuous edge at the other of the two opposing sides,
    wherein an acute angle is defined between transition surfaces of adjacent gear teeth that face one another, and one of the sloping surfaces interconnects the transition surfaces of the adjacent gear teeth,
    wherein the sloping surfaces are configured to either prevent or limit the accumulation of material thereon.

14. The sprocket of claim 13, wherein a width (F1) of the central plateau portion measured between the two opposing sides is less than a total width (F) of the sprocket measured between the two opposing sides.

15. The sprocket of claim 14, wherein the central plateau portion is centered along the width (F) of the sprocket in an axial direction.

16. The sprocket of claim 13, wherein the central plateau portion is curved in a circumferential direction about the axis of rotation, whereas the central plateau portion does not curve in an axial direction along the axis of rotation.

17. The sprocket of claim 13, wherein the central plateau portion is either a cylindrical surface or a flat surface.

18. The sprocket of claim 13, wherein each sloping surface is either beveled or rounded.

19. The sprocket of claim 13, wherein the single continuous edge is disposed closer to the axis of rotation than the bottom land.

20. The sprocket of claim 13, wherein said transition surfaces are non-parallel.

21. A combine harvester comprising the conveyor and sprocket of claim 13.

* * * * *